(12) United States Patent
Triglavcanin

(10) Patent No.: US 8,021,559 B2
(45) Date of Patent: Sep. 20, 2011

(54) THICKENING APPARATUS AND METHOD FOR THICKENING

(75) Inventor: Richard Triglavcanin, Dalkeith (AU)

(73) Assignee: Outotec Oyi, Espoo (FI)

(*) Notice: Subject to any disclaimer, the term of this patent is extended or adjusted under 35 U.S.C. 154(b) by 79 days.

(21) Appl. No.: 12/446,262

(22) PCT Filed: Oct. 16, 2007

(86) PCT No.: PCT/FI2007/000247
§ 371 (c)(1),
(2), (4) Date: Apr. 20, 2009

(87) PCT Pub. No.: WO2008/053065
PCT Pub. Date: May 8, 2008

(65) Prior Publication Data
US 2010/0187191 A1 Jul. 29, 2010

(30) Foreign Application Priority Data
Oct. 30, 2006 (FI) ..................................... 20060955

(51) Int. Cl.
*B01D 21/24* (2006.01)
(52) U.S. Cl. ..................... 210/801; 210/519; 210/532.1
(58) Field of Classification Search .................. 210/800, 210/801, 519, 528, 532.1
See application file for complete search history.

(56) References Cited

U.S. PATENT DOCUMENTS

| | | | |
|---|---|---|---|
| 1,065,542 A * | 6/1913 | Main .............................. | 210/519 |
| 2,205,199 A * | 6/1940 | Hubbell et al. ................ | 210/520 |
| 3,006,474 A | 10/1961 | Bryant | |
| 3,539,051 A * | 11/1970 | Stone ............................. | 210/528 |
| 4,270,676 A | 6/1981 | Green | |
| 4,541,850 A * | 9/1985 | Oda et al. ....................... | 210/519 |
| 5,147,556 A * | 9/1992 | Taylor ............................ | 210/801 |
| 6,276,537 B1 * | 8/2001 | Esler et al. ..................... | 210/519 |
| 6,334,952 B1 | 1/2002 | Hayakawa et al. | |
| 6,800,209 B2 | 10/2004 | Wright | |
| 6,966,985 B2 * | 11/2005 | Schoenbrunn et al. ........ | 210/528 |
| 7,238,281 B2 * | 7/2007 | Su et al. ..................... | 210/532.1 |
| 7,422,683 B2 * | 9/2008 | Park .............................. | 210/519 |
| 7,794,609 B2 * | 9/2010 | Egan, III ....................... | 210/801 |
| 2003/0136730 A1 * | 7/2003 | Schneider et al. ............ | 210/519 |
| 2005/0115907 A1 | 6/2005 | Taylor | |
| 2007/0209996 A1 | 9/2007 | Zhou | |

FOREIGN PATENT DOCUMENTS

| | | | |
|---|---|---|---|
| SU | 1503848 A1 | 8/1989 | |
| WO | 0012192 A1 | 3/2000 | |
| WO | 0119488 A1 | 3/2001 | |

* cited by examiner

Primary Examiner — Christopher Upton
(74) Attorney, Agent, or Firm — Chernoff, Vilhauer, McClung & Stenzel

(57) ABSTRACT

A thickening apparatus (1) and method adapted to liquids carrying suspended particles, such as slurry containing minerals, when there is a tank (2), where settling of solids takes place, a feedwell (4), which includes a chamber having means for receiving fed material (11), such as slurry and at least one outlet (5) in fluid communication with the tank and means for distributing the material in the tank, means for delivering the fed material (11), at least slurry, into the feedwell, when inside the feedwell there is arranged a separate mixing space (12) for the fed material (11), when there is arranged at least one horizontal element (7, 15, 22, 23) reaching at least partly the cross-section of the feedwell, from which mixing space the fed material (11) is allowed to flow into other section (14) of the feedwell.

37 Claims, 4 Drawing Sheets

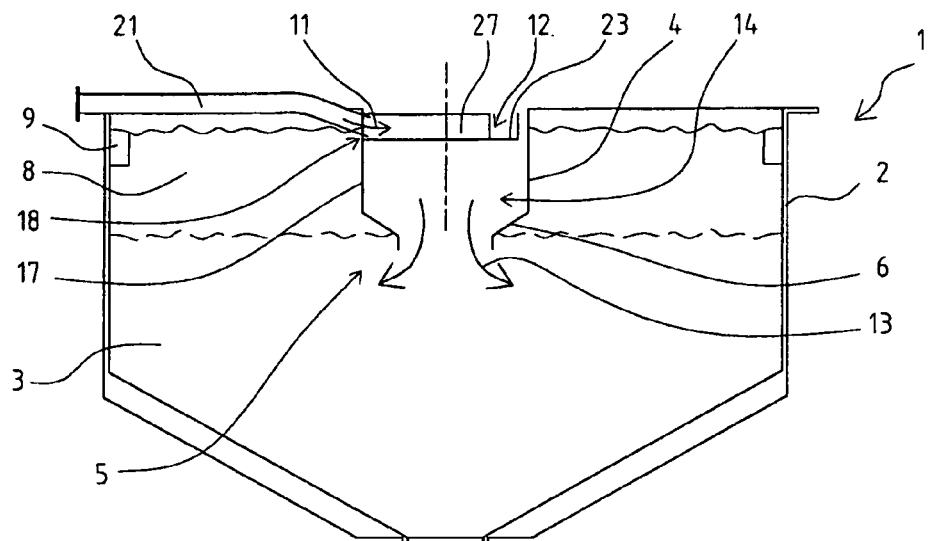
Fig. 7
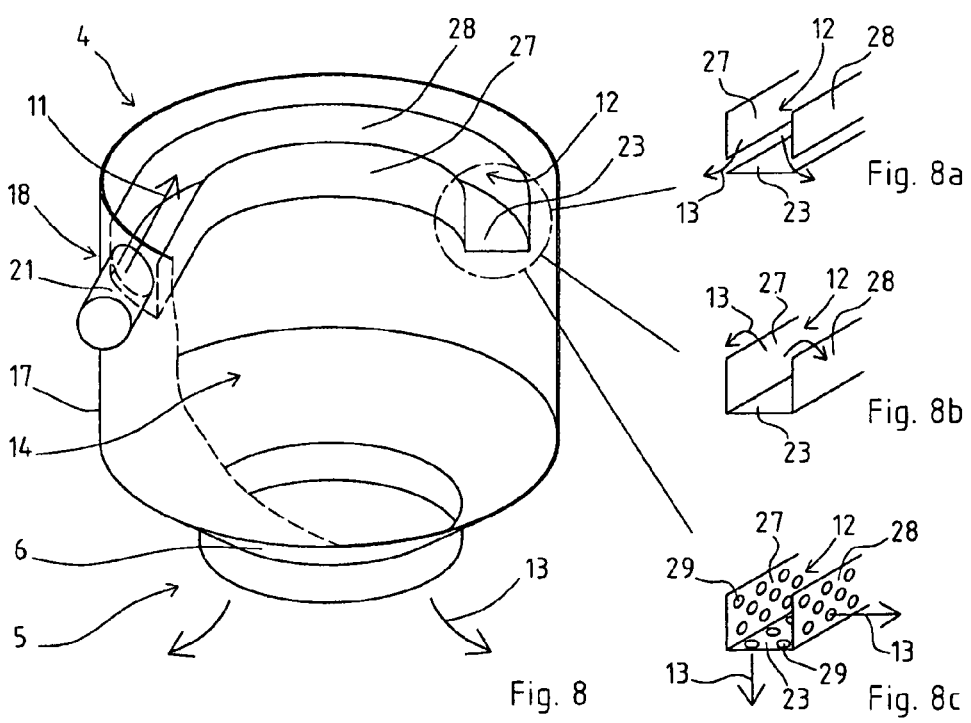
Fig. 8
Fig. 8a
Fig. 8b
Fig. 8c

THICKENING APPARATUS AND METHOD FOR THICKENING

This is a national stage application filed under 35 USC 371 based on International Application No. PCT/FI2007/000247 filed Oct. 16, 2007, and claims priority under 35 USC 119 of Finnish Patent Application No. 20060955 filed Oct. 30, 2006.

BACKGROUND OF THE INVENTION

This invention relates in general to solid-liquid separation. Specifically the invention relates to a thickening apparatus and method for thickening, when there is a separate mixing space created inside the feedwell in order to enhance the mixing of the fed material before entering the tank.

In a clarification or thickening process a slurry comprising liquids carrying suspended particles is introduced into the thickener or settling tank in order to separate particles from liquid. Basic components of a thickener are bridge and tank, drive, feedpipe, feedwell, rakes (including shaft and scrapers), underflow cone and overflow launder. In the tank the suspended particles form a thickened mud on the bottom of the tank. The thickened material settles to the bottom of the thickener tank and is further removed and processed, while the liquor component rises to the upper part of the thickener to flow into the overflow launder and exits the overflow box. A rake is arranged to move the viscous solids settled on the bottom of the thickener towards an underflow cone positioned in the center of the thickener tank. Slurry enters the thickener through the feedpipe and feedwell. The rate of settling is often increased using an optimized amount and type of flocculating agents. The flocculant is added into the feed in order to agglomerate the suspended particles of the slurry. The idea in flocculation is to bind solid particles together to assist the gravity based separation process. In flocculating certain pulps, it is sometimes necessary to first dilute the pulp in order for efficient flocculation to take place when a flocculant is added.

A feedwell is often used to feed the slurry into the thickener tank through the bottom of the feedwell and to provide means for flocculating a slurry before entering the tank. Also the thickener feedwell's function is to mix the slurry feed with flocculant and allow the flocculated solids to settle. The feedwell is typically located in the middle of the thickener tank to allow these settling solids to be evenly distributed within the thickener tank. To make the flocculation process more effective and efficient the slurry feed usually needs to be diluted with extra process liquid. The dilution is usually achieved in thickeners by recycling some of the dilute liquid overflow from the top of the thickener tank back to the feedpipe and/or feedwell in order to dilute the inflowing pulp. In order to recycle the overflow liquor sometimes pumps, fluid lines and valves need to be installed. One way to dilute the slurry is to circulate the dilution liquid from outside the feedwell to inside the feedwell through an opening in the feedwell wall or through a separate conduit.

Sometimes there occurs a problem in a feedwell, when there is a tendency for the feed material to flow directly to the bottom outlet. The retention time for solid particles inside the feedwell is low. Then those particles do not effectively mix with dilution liquid and the flocculant. The particles simply flow straight across the feedwell, downwards and out. This tendency is greater for the coarse particle fraction of the incoming solids feed. As a result, the diluting liquid is not properly mixed in with the feed material and only partial flocculation may occur. The mixing effect in the feedwell has to be effective in order to mix the feed slurry with the dilution liquid and the flocculant properly.

The object of this invention is to provide a thickening apparatus and method, whereby the efficient mixing of the fed material inside the feedwell of the thickener tank is achieved.

SUMMARY OF THE INVENTION

The invention concerns a thickening apparatus adapted to liquids carrying suspended particles, such as slurry containing minerals, the thickening apparatus comprising a tank, where settling of solids takes place, forming a bed of thickened pulp, and dilute liquid of lower relative density is thereby displaced towards the top of the tank, a feedwell, which includes a chamber having means for receiving fed material, such as slurry and at least one outlet in fluid communication with the tank and means for distributing the material in the tank, means for delivering the fed material, at least slurry, into the feedwell, when inside the feedwell there is arranged a separate mixing space for the fed material, when there is arranged at least one horizontal element reaching at least partly the cross-section of the feedwell, from which mixing space the fed material is allowed to flow into other section of the feedwell, which means that sections of the feedwell, that are not defined by the mixing space. The apparatus of the current invention reduces the short-circuiting of the fed material and promotes mixing of the feed, dilution and flocculant streams. When creating a reduced volume by the mixing space for the fed material, the available kinetic energy of the fed material is dissipated in the reduced volume and the mixing of the fed material is enhanced.

According to one embodiment of the invention the entry point of the fed material is above the interface between the mixing space and the other section of the feedwell. Then the fed material does not flow directly out of the feedwell.

According to one embodiment of the invention the fed material is arranged to flow through horizontal element in vertical direction.

According to one embodiment of the invention the horizontal element has a plurality of holes in it. According to another embodiment of the invention the horizontal element consists of at least a set of vane elements at certain intervals extending radially inside the feedwell, when the vane elements form an angle of 0-90° to the horizontal plane.

According to one embodiment of the invention the mixing space includes at least one inner plate element and at least one outer plate element for restricting the flow of the fed material in the horizontal direction. According to one example of the invention the inner plate element is a round vertical cylinder element arranged in the middle of the feedwell. According to one example of the invention the outer plate element is the feedwell wall. According to one example of the invention the outer vertical plate element is a round vertical cylinder element arranged in between the feedwell wall and the inner element.

According to one example of the invention the outer plate element and/or inner plate element is equipped with holes or similar in order for the fed material to flow through them in horizontal direction. According to one embodiment the outer plate element and/or the inner plate element are separated from the horizontal element.

According to the method of the invention the fed material flows inside the feedwell into the separate mixing space, where the kinetic energy of the fed material is firstly dissipated, which consists of at least one horizontal element reaching at least partly the cross-section of the feedwell, when the fed material flows from the mixing space into the other section of the feedwell.

According to one example of the invention the fed material flows inside the feedwell tangentially.

According to another embodiment of the methods the fed material flows through horizontal element, for example through holes in vertical direction into the other section of the feedwell. According to another embodiment of the method the horizontal element consists of at least a set of vane elements at certain intervals extending radially inside the feedwell, when the fed material flows through the gaps of the vanes. According to another embodiment of the method the flow of the fed material in horizontal direction inside the feedwell is restricted by at least one inner plate element and at least one outer plate element. According to one example of the invention the material flows through inner plate element and/or outer plate element into the other section of the feedwell. According to one example of the invention the fed material flows under the inner plate element and/or outer plate element into the other section of the feedwell. According to one example of the invention the fed material flows as an overflow from the mixing space into the other section of the feedwell.

By using the apparatus and method of the invention, the retention time of the solids particles within the feedwell is prolonged and the advantageous mixing of the fed material is reached.

The invention is described in more detail in the following figures

BRIEF DESCRIPTION OF THE DRAWINGS

FIG. 7 is a schematic presentation of the embodiment according to the present invention FIG. 8 is a 3d-cut-away presentation of the embodiment of the present invention described in FIG. 7.

FIG. 8a is a schematic presentation of the embodiment according to the present invention FIG. 8b is a schematic presentation of the embodiment according to the present invention FIG. 8c is a schematic presentation of the embodiment according to the present invention

DETAILED DESCRIPTION OF THE PREFERRED EMBODIMENTS

Figure 1:
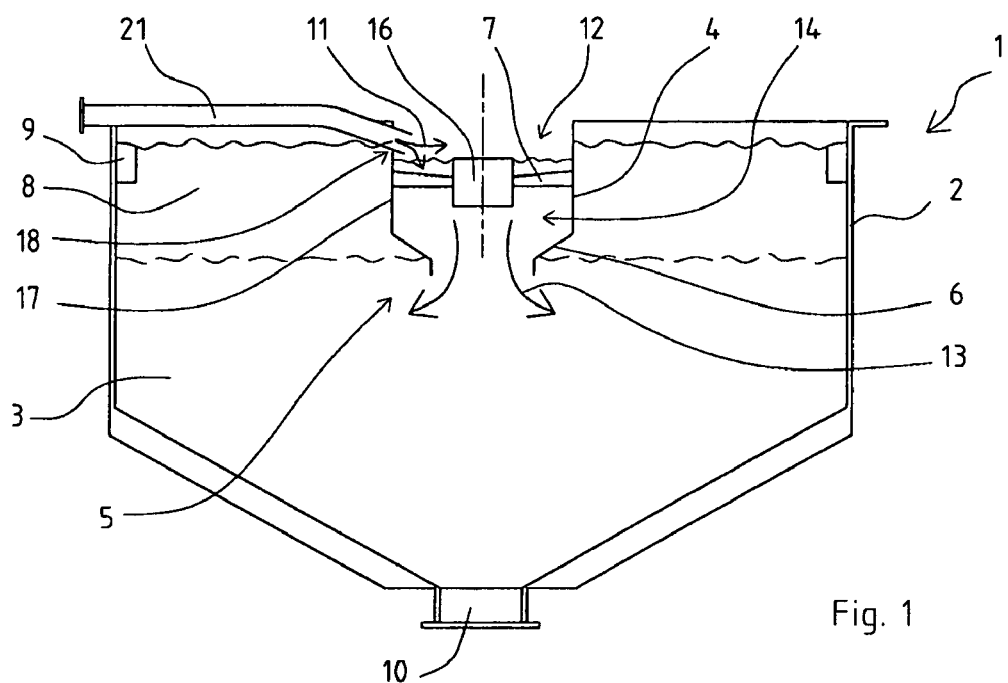
FIG. 1 is a schematic presentation of the thickening apparatus according to the present invention

The thickening apparatus according to one preferred embodiment of the present invention comprises a thickener 1 with a circular tank 2 for containing liquid pulp 3 as described in FIGS. 1-8. According to this example of the invention a feedwell 4 is arranged in the middle of the tank 2 and it is supplied with means 21 for feeding material 11, such as slurry and diluting material inside the feedwell. Also flocculating agent is fed when needed. The feedwell has a bottom opening 5 in fluid communication with the tank 2 and through which liquid pulp in the feedwell can flow into the tank. The bottom section of the feedwell wall preferably comprises a downwardly conical plate 6, so that the flow area of the liquid is smaller in the bottom section than in the above section in order to restrict the flow of liquid between the tank and the feedwell. Flocculating agent is mixed into the slurry, normally in the feedwell during feeding the slurry into the tank. The flocculating agent promotes the settling of the mineral slurry to the bottom of the tank and into the underflow cone. In normal operation, settling of solids takes place in the thickener tank, whereby a bed of thickened pulp 3 settles to displace an upper layer of relatively dilute liquid 8 towards the top of the tank. The thickener tank is surrounded by an overflow launder 9 which channels excess overflow liquid to a discharge pipe. The concentrated slurry is withdrawn from the underflow cone via an outlet line 10.

As shown in FIGS. 2, 4, 6 and 8, where the wall 17 of the feedwell 4 is shown partially as a cut-away picture, it can be seen that the fed material 11, such as slurry, dilution liquid and flocculation agent are fed into the feedwell 4 in order to mix them properly before entering the tank. The fed material 11 flows into the feedwell, where particles within the slurry, flow around the feedwell effectively mixing with dilution liquid and flocculant in the upper section of the feedwell. According to the invention inside the feedwell there is arranged a separate mixing space 12 for the fed material, when there is arranged at least one horizontal element 7, 15, 22 and 23 spanning at least partly the cross-section of the feedwell 4, from which mixing space 12 the fed material 11 is allowed to flow as an outflowing material 13 into the lower section 14 of the feedwell and further outside the feedwell into the tank. This way the feedwell is separated in the vertical direction into at least two separate sections and the fed material 11 inside the feedwell is allowed to flow between the mixing space 12 and the lower section 14 of the feedwell. The entry point 18 of the fed material 11 is above the interface between the mixing space 12 and the lower section 14 of the feedwell. The mixing space 12 in the upper section of the feedwell provides a space having a reduced volume, where the kinetic energy of the fed material 11 is dissipated and the mixing of the fed material 11 is highly enhanced. According to the examples of the invention the fed material 11 is allowed to flow through horizontal element 7, 15, 22 or 23 in vertical direction through gaps or holes 19, 29 or similar. The mixing space 12 consists of at least one vertically adjusted inner plate element 16, 24 as shown in FIGS. 1, 2 and 3, 4. As shown in FIGS. 5-8, there are arranged vertically two inner and outer plate elements 25, 26 and 27, 28 for restricting the flow in horizontal direction in the mixing space 12.

Figure 2:
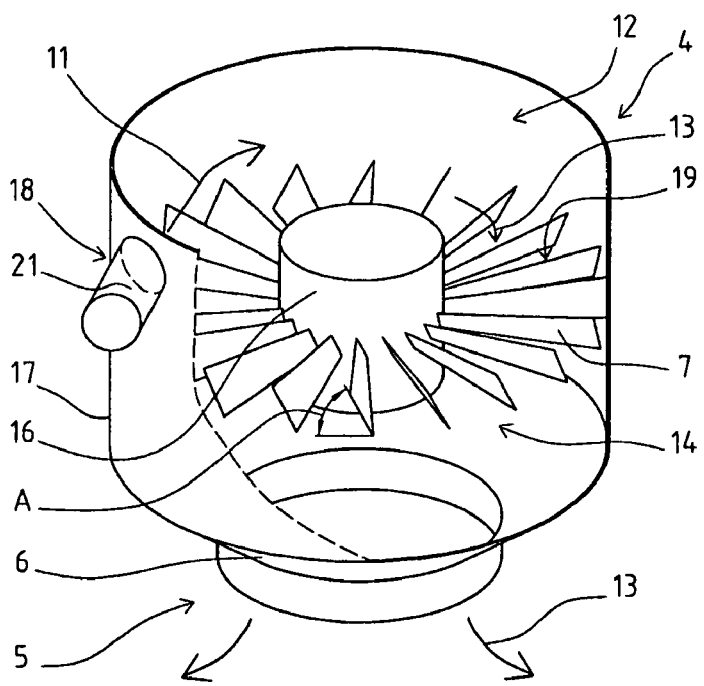
FIG. 2 is a 3d-cut-away presentation of the embodiment of the present invention described in FIG. 1

As shown in FIGS. 1 and 2, the separate mixing space 12 consists of at least a set of vane elements 7 acting as a horizontal element at certain intervals extending radially inside the feedwell forming a boundary between the mixing space 12 and the lower section 14 of the feedwell. In this example the lower section 14 of the feedwell is lower to the mixing space 12. Also preferably the mixing space includes one vertically adjusted inner plate element 16 and one vertically adjusted outer plate element 17, which is the wall of the feedwell for restricting the flow in horizontal direction. The vane elements 7 are arranged below the entry point 18 of the fed material 11. The mixing of the fed material is done above the vane elements 7, in the mixing space 12. After that the outflowing material 13 from the mixing space 12 flows between the gaps 19 of the vanes 7 downwardly into the lower section 14 of the feedwell and from there into the tank 2 through the bottom outlet 5 of the feedwell. According to this example of the invention, the vane elements form an angle A, preferably 30° to the horizontal plane. The vane elements 7 are attached into the plate elements 16 and 17 by using any kind of attaching mechanism. An inner plate element 16 is a round cylinder element in the middle of the feedwell, which has a role of being as an inner boundary to the vane elements 7 and to the mixing space 12, so that the fed material 11 is constrained from flowing off the edge of the vanes. The vane elements 7 are attached from their lower end to an outer plate element 17, which in this example is a feedwell wall and also is an outer boundary to the vane elements 7 and to the mixing space 12.

Figure 3:
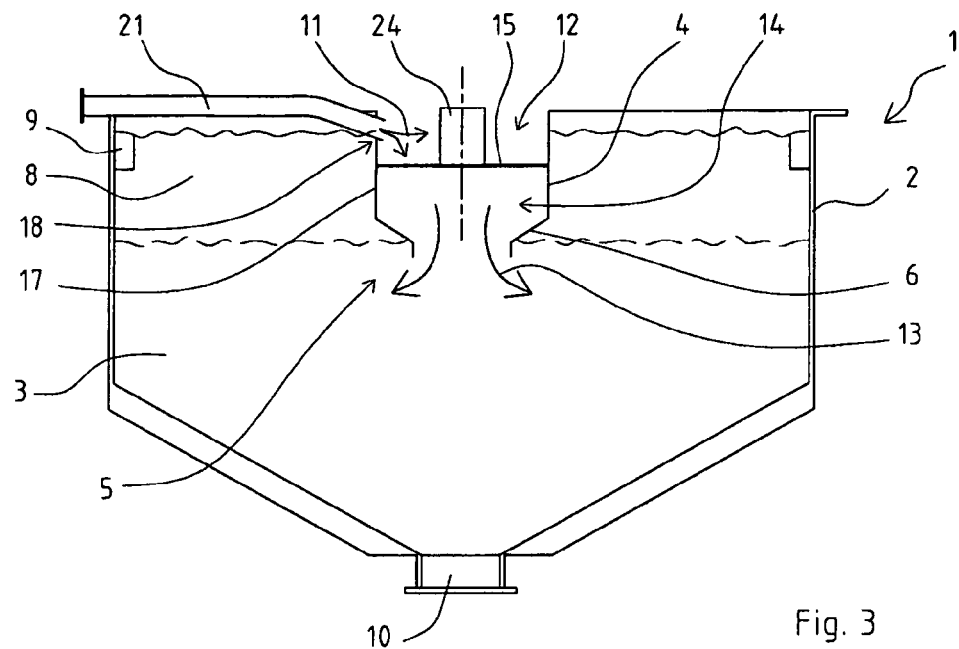
FIG. 3 is a schematic presentation of the embodiment according to the present invention
Figure 4:
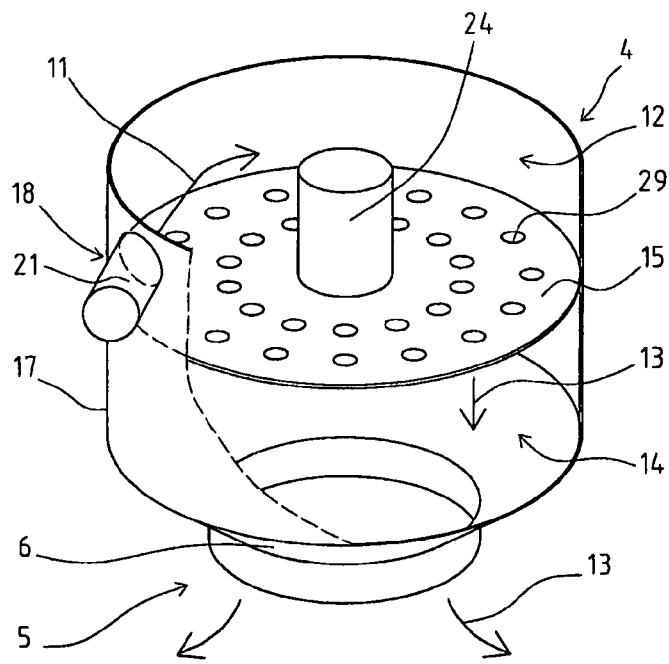
FIG. 4 is a 3d-cut-away presentation of the embodiment of the present invention described in FIG. 3

The example described in FIGS. 3 and 4 shows a separate mixing space 12, which is formed by using a horizontal plate element 15 and an inner plate element 24 for restricting the flow inside the mixing space 12. The horizontal plate element 15 has a plurality of holes 29 or similar in it in order the outflowing material 13 to flow downwardly inside the feedwell 4. The fed material 11 is mixed inside the mixing space 12, which creates a reduced volume to the material where the kinetic energy of the fed material is dissipated.

Figure 5:
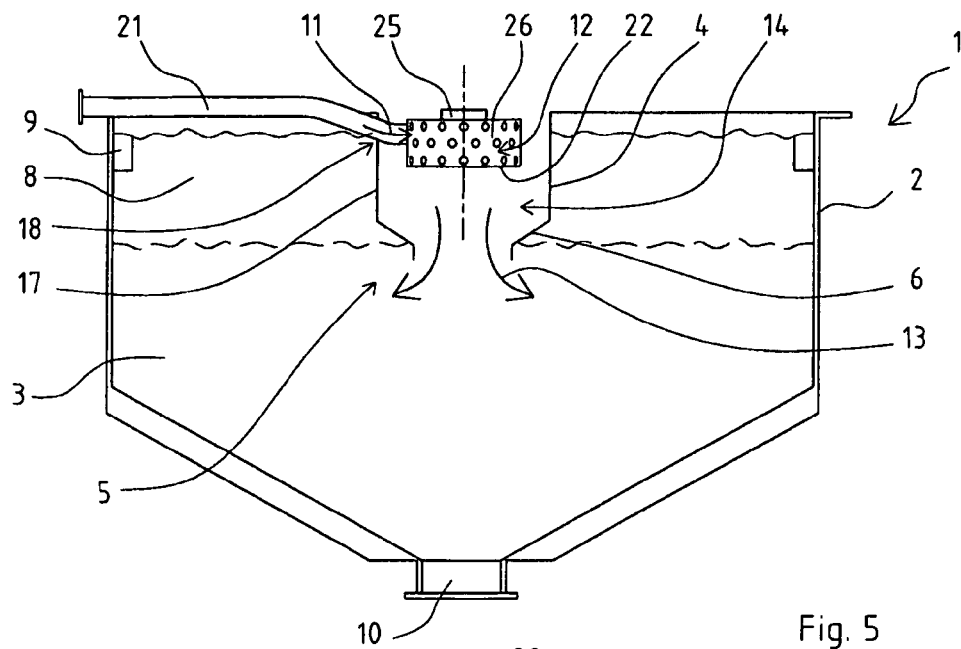
FIG. 5 is a schematic presentation of the embodiment according to the present invention
Figure 6:
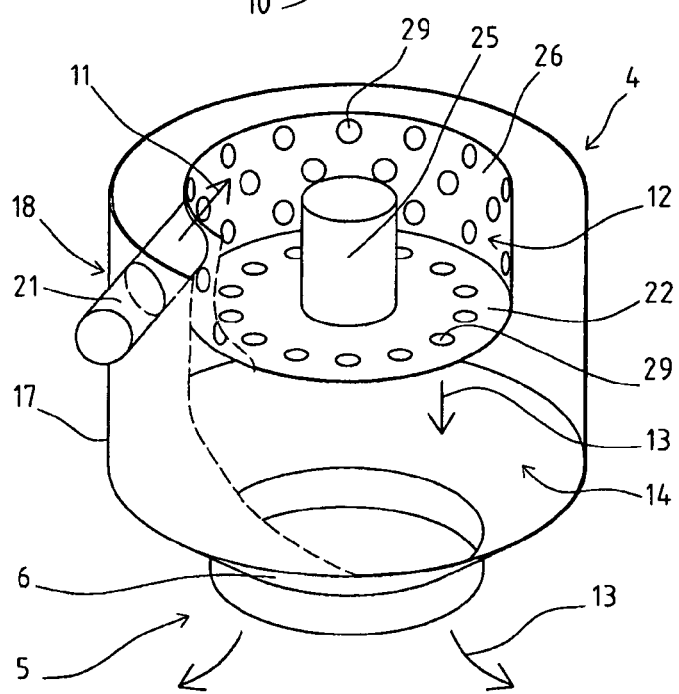
FIG. 6 is a 3d-cut-away presentation of the embodiment of the present invention described in FIG. 5

The example of the invention described in FIGS. 5 and 6 shows a separate mixing space 12 created by horizontal element 22, through which the outflowing material 13 flows through the holes 29. There are two vertically adjusted plate elements 25 and 26 for restricting the flow of the fed material 11 in horizontal direction inside the mixing space 12. According to this example the outflowing material 13 is allowed to go through holes 29 arranged in the outer plate element 26, which is arranged in the space between the feedwell wall 17 and the inner plate element 25.

The example described in FIGS. 7 and 8, 8*a*, 8*b*, and 8*c* shows the mixing space 12, which is formed inside the feedwell. The mixing space according to this example consists of a horizontal element 23, which holds up the fed material 11 inside the mixing space 12, which creates a reduced volume to enhance the mixing of the fed material 11. From the mixing space 12 the fed material is allowed to flow into lower section of the feedwell, meaning the sections above, adjacent and lower sections of the feedwell. The horizontal element 23 forms a ring inside the feedwell, which element is shown as a cutaway-picture in FIG. 8. The mixing space 12 is equipped with two plate elements 27 and 28 for restricting the flow in horizontal direction inside the mixing space 12. According to one example of the invention the outflowing material 13 is allowed to go through the gap between the plate elements 27, 28 and the horizontal element 23, as shown in FIG. 8*a*. The outflowing material 13 could also be arranged to flow as an overflow from the mixing space 12 into the lower section 14 of the feedwell, as described in FIG. 8*b*. The FIG. 8*c* shows also one embodiment of the invention, according to which the outflowing material 13 is arranged to flow through holes 29 or similar arranged in the plate elements 27 and 28.

While the invention has been described with reference to its preferred embodiments, it is to be understood that modifications and variations will occur to those skilled in the art. Such modifications and variations are intended to fall within the scope of the appended claims.

The invention claimed is:

1. A thickening apparatus for a feed liquid carrying suspended particles, the thickening apparatus comprising:
    a tank in which settling of solids takes place, whereby pulp of higher relative density settles towards the bottom of the tank, forming a bed of thickened pulp, and dilute liquid of lower relative density is thereby displaced towards the top of the tank,
    a feedwell disposed within the tank, the feedwell defining a chamber and having an inlet for receiving feed liquid and delivering the feed liquid tangentially into the chamber and an outlet in fluid communication with the tank for discharging liquid from the chamber into the tank, wherein the feedwell comprises an outer wall that bounds the chamber outwardly, a horizontal structure within the feedwell and dividing said chamber into an upper mixing space and a lower outlet space, and an inner bounding element that bounds at least the upper mixing space inwardly, whereby the upper mixing space is substantially annular, and
    a feed pipe for delivering feed liquid to the inlet of the feedwell,
    and wherein the inlet of the feedwell is located above the horizontal structure, whereby the inlet delivers the feed liquid into the upper mixing space, and the horizontal structure is a baffle structure that restricts downward flow of liquid from the upper mixing space to the lower outlet space and defines passages that allow downward flow of liquid from the upper mixing space to the lower outlet space.

2. A thickening apparatus according to claim 1, wherein the baffle structure comprises a plate element formed with a plurality of holes.

3. A thickening apparatus according to claim 1, wherein the baffle structure comprises a plurality of vane elements disposed at an acute angle to a horizontal plane.

4. A thickening apparatus according to claim 1, wherein the baffle structure comprises an annular plate element extending inward relative to the outer wall of the feedwell.

5. A thickening apparatus according to claim 1, wherein the inner bounding element comprises a circular vertical cylindrical element disposed centrally in the feedwell.

6. A thickening apparatus according to claim 1, wherein the baffle structure is attached at an inner edge to the inner bounding element and at an outer edge to the outer wall of the feedwell.

7. A thickening apparatus according to claim 1, wherein the inlet of the feedwell is at an outer periphery of the upper mixing space.

8. A method for thickening a feed liquid carrying suspended particles, the method comprising:
    providing a thickening apparatus comprising a tank and a feedwell disposed within the tank,
    delivering feed liquid tangentially into an annular upper mixing space of the feedwell,
    allowing downward flow of feed liquid from the upper mixing space of the feedwell into a lower outlet space of the feedwell, and
    allowing downward flow of feed liquid from the outlet space of the feedwell into the tank, in which settling of solids takes place, whereby pulp of higher relative density settles towards the bottom of the tank, forming a bed of thickened pulp, and dilute liquid of lower relative density is thereby displaced towards the top of the tank,
    and wherein downward flow of feed liquid from the upper mixing space into the lower outlet space is restricted.

9. A method according to claim 8, comprising restricting downward flow of feed liquid from the upper mixing space into the lower outlet space with a plate element disposed between the upper mixing space and the lower outlet space and formed with a plurality of holes.

10. A method according to claim 8, comprising restricting downward flow of feed liquid from the upper mixing space into the lower outlet space with a plurality of vane elements disposed between the upper mixing space and the lower outlet space at an acute angle to a horizontal plane.

11. A thickening apparatus for liquids carrying particles in suspension, the thickening apparatus including:
- a tank in which settling of solids takes place, whereby pulp of higher relative density settles towards the bottom of the tank and dilute liquid of lower relative density is thereby displaced towards the top of the tank;
- a feedwell including a chamber having an inlet for receiving feed liquid and an outlet in fluid communication with the tank; and
- a plurality of substantially horizontal spaced apart vane elements extending generally radially at least partly across the feedwell, to divide the feedwell into an upper mixing space and a lower outlet space,
- and wherein the inlet delivers feed liquid tangentially into the upper mixing space and the feed liquid flows downward past the vane elements into the lower outlet space and then through the outlet of the chamber into the tank, and the horizontal vane elements restrict downward flow of feed liquid from the upper mixing space into the lower outlet space.

12. A thickening apparatus according to claim 11, comprising a circular vertical cylindrical element disposed centrally in the feedwell and inwardly bounding the upper mixing space.

13. A thickening apparatus according to claim 12, wherein the vane elements are attached at an inner end to the cylindrical element and at an outer end to an outer wall of the feedwell.

14. A thickening apparatus according to claim 11, wherein the inlet of the feedwell is at an outer periphery of the upper mixing space.

15. A thickening apparatus according to claim 11, wherein the inlet delivers feed liquid tangentially into the upper mixing space in a first rotational direction and the vane elements define passages that extend downward within the feedwell from the upper mixing space to the lower outlet space and are disposed so that feed liquid passing from the upper mixing space to the lower outlet space flows in a second rotational direction, opposite to said first rotational direction.

16. A thickening apparatus according to claim 11, wherein the vane elements are inclined at an angle of about 30° to a horizontal plane.

17. A thickening apparatus according to claim 11, wherein the vane elements are arranged such that kinetic energy of the feed liquid is dissipated when the feed liquid flows from the upper mixing space into the lower outlet space.

18. A thickening apparatus according to claim 11, wherein the upper mixing space is defined by at least one inner plate element and at least one outer plate element, disposed to restrict the flow of the feed liquid in the horizontal direction.

19. A thickening apparatus according to claim 18, wherein the outer plate element forms an outer wall of the feedwell.

20. A thickening apparatus according to claim 18, wherein the inner plate element forms an inner wall of the feedwell.

21. A thickening apparatus according to claim 18, wherein the vane elements are attached to the inner plate element and/or the outer plate element.

22. A thickening apparatus according to claim 18, wherein the inner plate element forms an inner boundary for the vane elements and for the upper mixing space, and wherein the outer plate element forms an outer boundary for the vane elements and for the upper mixing space, such that the inner and outer plate elements constrain the feed liquid in the upper mixing space from flowing off the ends of the vanes.

23. A thickening apparatus according to claim 18, wherein the inner plate element and the outer plate element defining the upper mixing space are generally cylindrical in shape.

24. A thickening apparatus according to claim 11, wherein the inlet of the feedwell is positioned above the vane elements and the upper mixing space is positioned immediately above the lower outlet space.

25. A thickening apparatus according to claim 11, wherein the lower outlet space of the feedwell decreases in cross sectional area in a downward direction whereby the outlet of the chamber restricts the flow of liquid between the feedwell and the tank.

26. A method for thickening liquids carrying particles in suspension, the method including the steps of:
- providing thickening apparatus comprising a tank and a feedwell disposed inside the tank,
- delivering feed liquid tangentially into an upper mixing space of the feedwell,
- allowing downward flow of feed liquid from the upper mixing space of the feedwell into a lower outlet space of the feedwell, and
- allowing downward flow of feed liquid from the outlet space of the feedwell into the tank, in which settling of solids takes place, whereby pulp of higher relative density settles towards the bottom of the tank, forming a bed of thickened pulp, and dilute liquid of lower relative density is thereby displaced towards the top of the tank,
- and wherein downward flow of feed liquid from the upper mixing space into the lower outlet space is restricted by a plurality of substantially horizontal spaced apart vane elements that extend generally radially at least partly across the feedwell.

27. A method according to claim 26, including the step of arranging the vane elements such that kinetic energy of the feed liquid is dissipated when the feed liquid flows from the upper mixing space into the lower outlet space.

28. A method according to claim 26, wherein the vane elements are inclined at an angle of about 30° to a horizontal plane.

29. A method according to claim 26, further comprising the steps of defining the upper mixing space by at least one inner plate element and at least one outer plate element, and positioning the at least one inner plate element and at least one outer plate element to restrict the flow of the feed liquid in the horizontal direction.

30. A method according to claim 29, further comprising the step of arranging the outer plate element so as to form an outer wall of the feedwell.

31. A method according to claim 29, further comprising the step of arranging the inner plate element so as to form an inner wall of the feedwell.

32. A method according to claim 29, further comprising the step of forming holes in either or both of the inner plate element and the outer plate element to permit flow of the feed liquid from the upper mixing space in the horizontal direction.

33. A method according to claim 29, further comprising the step of attaching the vane elements to the inner plate element and/or the outer plate element.

34. A method according to claim 29, further comprising the steps of forming an inner boundary for the vane elements and for the upper mixing space with the inner plate element, forming an outer boundary for the vane elements and for the upper mixing space with the outer plate element, thereby constraining the feed liquid in the upper mixing space from flowing off the ends of the vanes with the inner and outer plate elements.

35. A method according to claim 29, wherein the inner plate element and the outer plate element defining the upper mixing space are generally cylindrical in shape.

36. A method according to claim 26, further comprising the step of positioning the inlet of the feedwell above the vane elements and positioning the upper mixing space immediately above the lower section.

37. A method according to claim 26, further comprising the step of forming the outlet of the feedwell with a restricted bottom opening to restrict the flow of liquid between the feedwell and the tank.

\* \* \* \* \*